United States Patent [19]
Meyer

[11] 3,795,984
[45] Mar. 12, 1974

[54] METHOD AND ARRANGEMENT FOR MEASURING THE MOISTURE CONTENT IN FIBROUS MATERIAL

[75] Inventor: Gerhard Meyer, Bochholz, Germany

[73] Assignee: Hauni-Werke Korber & Co. KG, Hamberg, Germany

[22] Filed: Dec. 29, 1972

[21] Appl. No.: 319,769

[30] Foreign Application Priority Data
Dec. 31, 1971 Germany............................ 2165819

[52] U.S. Cl...................... 34/46, 131/135, 318/662, 324/61 QS
[51] Int. Cl. .......................................... G01n 27/12
[58] Field of Search....... 324/61 QS, 61 R; 131/135; 34/46; 318/662

[56] References Cited
UNITED STATES PATENTS
2,807,720  9/1957  Charles........................... 324/61 QS
2,963,642  12/1960  Arbogast et al. ................ 324/61 QS
3,433,217  3/1969  Rieke............................. 324/61 QS
3,582,827  6/1971  Bjerede............................. 324/61 R Primary Examiner—Stanley T. Krawczewicz
Attorney, Agent, or Firm—Michael S. Striker

[57] ABSTRACT

A measuring capacitor has a capacitance which varies with moisture content of the material. The capacitor is part of a tuned circuit which is kept in resonance by changing the frequency applied thereto. A voltage having an amplitude corresponding to the change in frequency constitutes a measuring signal indicative of moisture content in a high moisture content range. A rectified signal derived from the voltage or current in the tuned circuit constitutes a measuring signal indicative of moisture content in the low moisture content range.

13 Claims, 8 Drawing Figures

METHOD AND ARRANGEMENT FOR MEASURING THE MOISTURE CONTENT IN FIBROUS MATERIAL

BACKGROUND OF THE INVENTION

The present invention relates to a method and arrangement for furnishing a measuring signal indicative of the moisture content of fibrous material, and in particular of the moisture content of tobacco or similar smoking goods. In particular it relates to such methods and arrangements wherein tobacco is transported between the electrodes of a measuring capacitor whose lines of force pass through said tobacco and whose electrical characteristics therefore change as a function of the moisture content in said tobacco. The measuring capacitor forms part of a tuned circuit which in turn is coupled to a high frequency oscillator. Such moisture measuring arrangments are used, for example, while tobacco is being transported to a drying station or while it is being transported from the drying station.

In known equipment of this type, the high frequency oscillator furnishes oscillator output signals which continuously vary in frequency in a periodic manner. The range of frequencies is adjusted by means of an adjustment capacitor in such a manner that each turn of a tuning capacitor causes the tuned circuit to be in resonance at one frequency in said range. An electronic volt meter then measures the voltage peaks which occur at the resonance of the tuned circuit. The height of the voltage peaks depends upon the dielectric losses in the measuring capacitor, which in turn vary as a function of the moisture content of the tobacco between the electrodes constituting the capacitor. However the range of frequencies which may be achieved by one turn of a tuning capacitor is relatively small and it can happen, when relatively large variations of moisture content occur, that the resonant frequency of the tuned circuit fall outside of the range of the frequency variation achieved by the turning of the tuning capacitor. Under these conditions a new adjustment of the adjustment capacitor must be made in order that the tuned circuit is tuned to the new moisture content region. However, this means that the equipment must constantly be monitored and controlled. The known equipment can only furnish measuring signals corresponding to a relatively narrow range of moisture content and must be retuned for ranges outside of this moisture content range. Further, the tuning capacitor is driven by a motor and the electronic volt meter which is required to measure the voltage peaks cause the equipment to be both bulky and expensive.

SUMMARY OF THE INVENTION

It is the object of the present invention to furnish an improved moisture measuring apparatus and method which can encompass a much larger region of moisture content.

In accordance with the present invention, a phase angle signal is generated which is indicative of the phase angle between the voltage and the current induced in the tuned circuit by the high frequency oscillator. The method of the present invention comprises changing an electrical parameter associated with said tuned circuit in dependence on the so-generated phase angle signal, until said phase angle signal is equal to a predetermined phase angle signal indicative of resonance in said tuned circuit means. Finally, an output signal varying as a function of said change in said electrical parameter or as a function of the voltage or current in said tuned circuit is furnished, said so-varying signal constituting a measuring signal indicative of the moisture content in said tobacco.

If the high frequency oscillator and the tuned circuit are inter-coupled in such a manner that the phase of a high frequency output signal (for example the voltage) furnished by the high frequency oscillator has a constant phase relationship with the phase of an electrical signal (for example the current) induced in the tuned circuit by the application of the high frequency output signal, then a phase comparison between the high frequency output signal and the electrical signal induced in the tuned circuit means is equivalent to a phase comparison between the current and the voltage induced in the tuned circuit means.

In a preferred embodiment of the present invention, the tuned circuit is maintained at resonance by controlling the output frequency of the high frequency oscillator.

Of course the tuned circuit could be maintained in resonance by controlling other electrical parameters associated therewith, for example by controlling the inductivity or the capacitance of an element in said tuned circuit.

It will be noted that the above-described method constitutes two ways of generating the measuring signal, namely either in dependence upon the change in amplitude of the voltage or current generated in the tuned circuit or in dependence upon the change in the electrical parameter (frequency) associated with the tuned circuit. It has been found experimentally that the two methods yield characteristic curves which have linear portions for different ranges of moisture content. Thus combining the two methods causes a distinct increase in the range of moisture content of tobacco for which a measuring signal can be furnished automatically. Thus it has been found that for low moisture content either the amplitude of the current or the voltage induced in the tuned circuit vary linearly as a function of moisture content, while at higher moisture contents the change in frequency required to keep the tuned circuit in resonance varies linearly with moisture content.

In accordance with the present invention, an arrangement is furnished which furnishes a measuring signal indicative of moisture content in fibrous material. The arrangement comprises high frequency oscillator means furnishing a high frequency output signal. It comprises tuned circuit means coupled to said high frequency oscillator means in such a manner the electrical signals including a voltage and a current are generated therein in response to said high frequency output signal. Measuring capacitor means are connected to said tuned circuit means, said measuring capacitor means having lines of force passing through said fibrous material, whereby the phase angle between said current and said voltage in said tuned circuit means varies as a function of moisture content in said fibrous material. The invention further comprises phase comparator means connected to said tuned circuit means for furnishing a phase angle signal corresponding to said phase angle between said current and said voltage in said tuned circuit means. Adjustment means are connected to said phase comparator means for changing an electrical parameter associated with said tuned circuit means in dependence upon said phase angle signal until said phase angle signal is equal to a predetermined phase angle signal corresponding to a resonant condition in said tuned circuit means. Finally, measuring signal furnishing means selectively furnish an output signal varying as a function of said change in said electrical characteristic or as a function of a determined one of said electrical signals in said tuned circuit means, said so-varying output signals constituting said measuring signal.

In a preferred embodiment of the present invention the high frequency oscillator means comprise a voltage-controlled oscillator whose frequency varies as a function of voltage supplied thereto. The adjustment means apply this controlled voltage to the high frequency oscillator means in dependence upon said phase angle signal and proportional thereto.

When the high frequency oscillator means and the tuned circuit means are inter-coupled as mentioned above, namely in such a way that the current in the tuned circuit has a constant phase relationship to the voltage of the high frequency oscillator means, then the phase comparator means compare the phase of the high frequency output voltage to the phase of the voltage induced in the tuned circuit means. When the change in an electrical parameter associated with said tuned circuit is a change in frequency of the signal applied thereto, then the arrangement further comprises reference oscillator means which furnish a signal having a constant frequency and frequency comparator means which compare the frequency of the high frequency output signal to the constant frequency furnished by the reference oscillator means and furnish said measuring signal as a function of the difference therebetween.

In a particularly preferred embodiment of the present invention, range selector means are provided which cause the above-mentioned signal derived from the difference in frequencies to be used as a measuring signal for high moisture content ranges and which cause either the amplitude of the current or the voltage induced in the tuned circuit means to constitute the measuring signal for low moisture content of the fibrous material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

A preferred embodiment of the invention will now be described with reference to the drawing.

Figure 1:
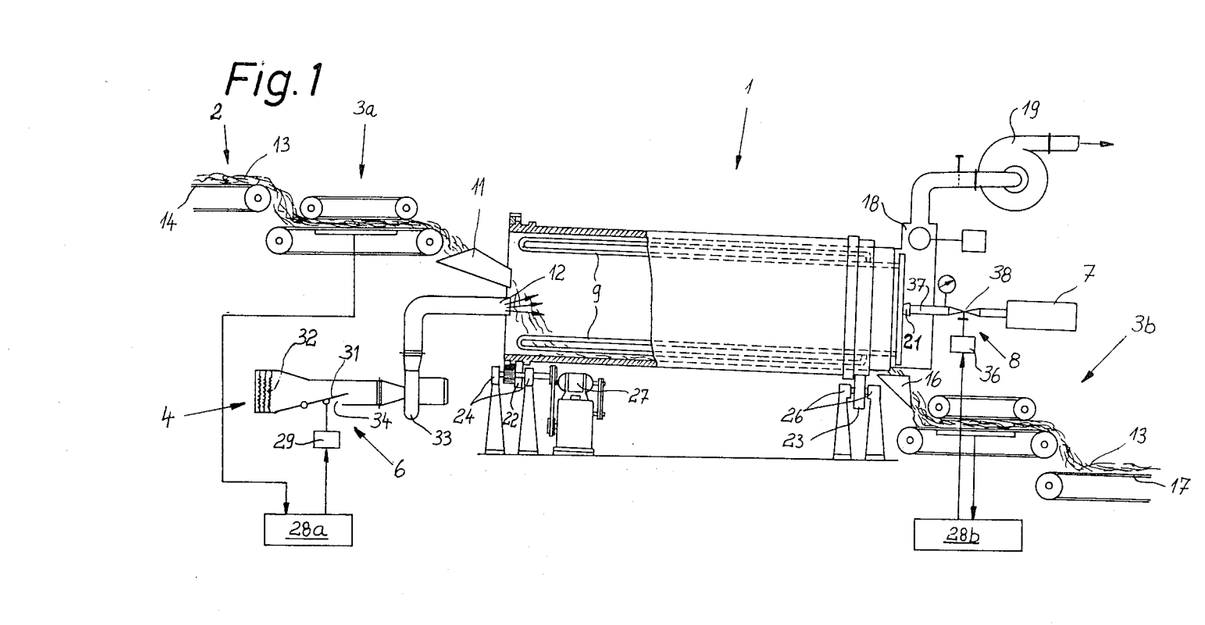
FIG. 1 shows a tobacco drying arrangement having a drum and a controllable heat source both at the input and at the output of the drying station.

Reference numeral 1 in FIG. 1 refers to a drum which is used for drying tobacco. A tobacco supply arrangement 2 transports the tobacco through a first moisture measuring arrangement 3a arranged prior to the drum, while a second moisture measuring arrangement 3b is arranged following the drum 1. The moisture measuring arrangements 3a and 3b are identically constructed and will be described in greater detail with reference to FIGS. 2-4 below. A first heat source 4 is arranged at the input side of drum 1 and furnishes hot air. The first heat source is controlled by means of a regulating member 6. A second heat source 7 is arranged at the output side of drum 1 and furnishes hot steam, which in turn is controlled by means of a second regulating member 8.

The basic heating arrangement for drum 1 is a wall heating arrangement in the form of hoses 9 which carry steam and which also serve as impellers for the tobacco situated in the drum. At the input side of drum 1 there is provided a slide 11 for tobacco and an input 12 for hot air. The slide 11 is preceded by heating arrangement 3a. The transport arrangement 2 which transports the tobacco at a substantially constant rate comprises a transport belt 14. At the output side of the drum a second slide 16 is furnished which is followed by the second moisture measuring arrangement 3b. This arrangement is in turn followed by a belt 17 which transports the dried tobacco 13 away from the drying station. Also, arranged at the output side of the drum is a suction hood 18 having a ventilator 19 which is used to remove vapor. Steam admitting means 21 for admitting the hot steam are also provided at the output side of the drum. The drum 1 is supported by rollers 22 and 23 which in turn are mounted on supports 24 and 26. The drum is driven by means of an electromotor 27.

A circuit arrangement 28a is connected to the measuring arrangement 3a, for controlling the position of a servomotor 29 which in turn controls a regulating element 6 having an air vent 41, which controls the air furnished by heat source 4. Heat source 4, which furnishes hot air, is an electrical heater 32 through which a ventilator 33 passes fresh air which is warmed by the electric heater 32. The position of air vent 31 controls the portion of unheated air relative to heated air, which proportion of course controls the actual heat supplied to the tobacco.

Similarly, the measuring arrangement 3b situated at the output side of the drum is connected to a circuit arrangement 28b, for the control of a regulating element 8 associated with the second heat source 7. The regulating element 8 comprises a servomotor 36 for a valve 38 which is situated in steam line 37. Steam line 37 supplies hot steam to the drum, which hot steam is generated by the second heat source 7 whose output is controlled by the above-mentioned regulating element (valve) 38.

Figure 2:
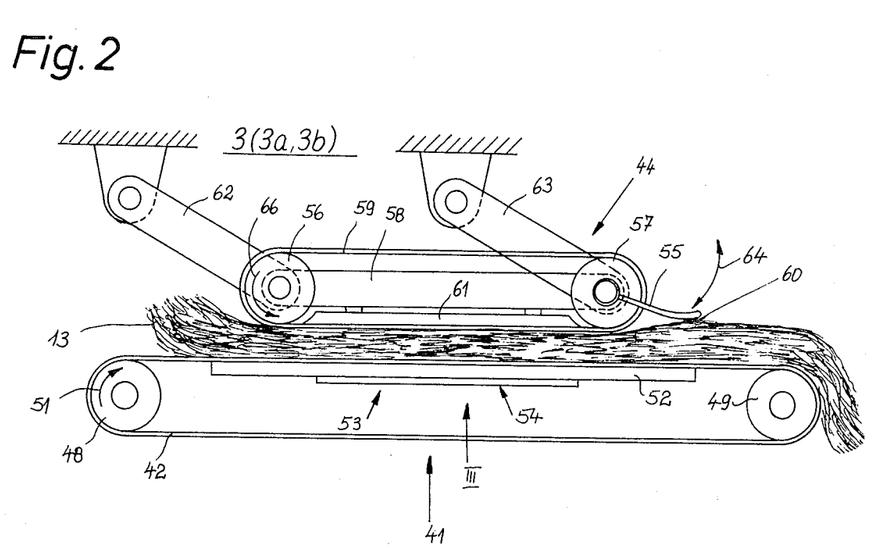
FIG. 2 shows a moisture measuring arrangement which may be arranged both at the input and at the output side of the drum of FIG. 1, in a side view.

FIG. 2 shows the moisture measuring arrangement 3 mentioned in connection with FIG. 1 above and having reference numerals 3a or 3b therein. The arrangement comprises transport means 41 which are embodied in an endless belt 42 and which transports the tobacco 13. A pressure transport means 44 presses the tobacco 13 onto the conveyor belt 41. The conveyor belt 41 passes around rollers 48 and 49. Roller 48 is driven in the direction of arrow 51. The upper side of the conveyor belt 42 passes over an isolating plate 52 which has good high frequency characteristics. At the lower side of isolating plate 52 are affixed electrodes 53 and 54 which will be described in detail with reference to FIG. 3. The pressure transport means 44 has rollers 56 and 57 which are supported by support means 58. A belt 59 passes around rollers 56 and 57. A support plate 51 is fastened to support means 58. The lower side of conveyor belt 59 passes over plate 51. The pressure transport means 54 are pivotally mounted in the direction of dobule arrow 64 on support means 62 and 63, so that the weight of the member 42 serves to compress tobacco 13. Roller 56 is driven in the direction of arrow 66. At the supporting point of roller 57, a lever 55 is supported which carries a thermoresistor 60 for measuring the temperature of tobacco 13. The thermoresistor 60 slides along the surface of the tobacco 13.

Figure 3:
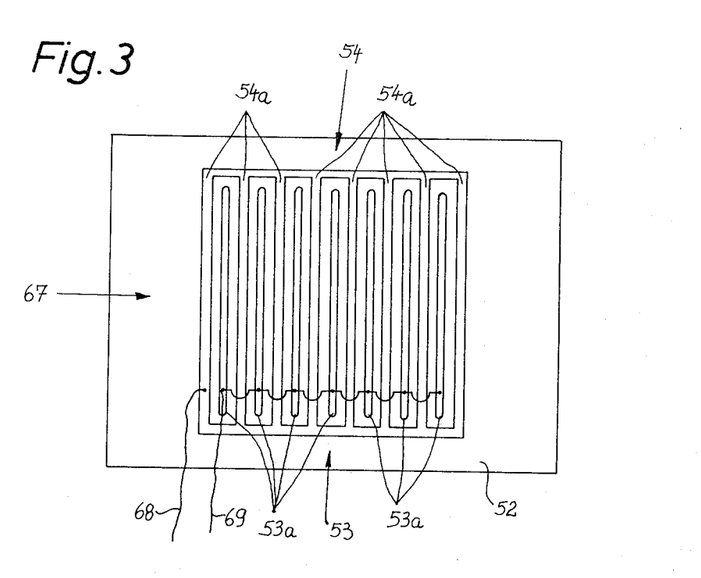
FIG. 3 shows the electrodes of the arrangement of FIG. 2 in a top view.

FIG. 3 shows a view of the lower side of the isolating plate 52 and in particular shows the electrodes 53 and 54. The view of the isolating plate is taken in the direction of arrow III in FIG. 2. Electrodes 53 and 54 constitute the measuring capacitor. Each of the electrodes 53 and 54 comprises a plurality of interconnected electrode elements 53a, 54a, respectively. Each of the electrode elements 53a is positioned between two electrode elements 54a. Lines 68 and 69 serve to connect electrodes 53 and 54 respectively to the circuit arrangements 28a or 28b as shown in FIG. 5.

Figure 4:
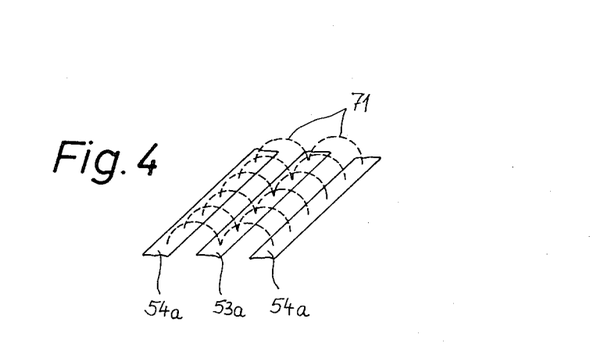
FIG. 4 is a perspective section of the electrodes of FIG. 3, and showing the lines of force of the electrical field existing between the electrodes.

FIG. 4 shows the lines of force 71 of an electrical field which exists between the electrode elements 53a and 54a.

Figure 5:
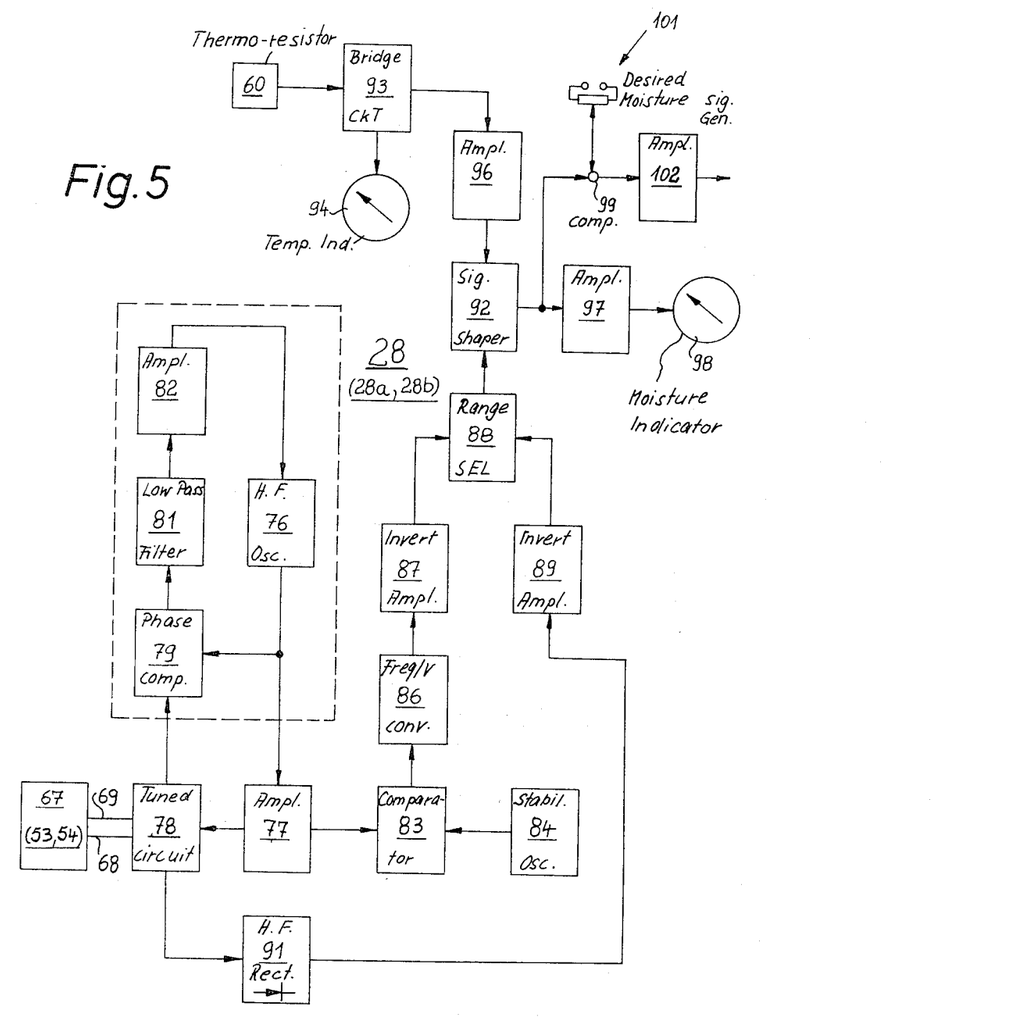
FIG. 5 is a circuit arrangement controlling the heat source at the input or at the output of the drying station.

FIG. 5 shows a circuit arrangement 28 which is associated with the moisture measuring arrangement 3a and the control element 6 for the first heat source 4. A completely similar circuit arrangement can of course be used with the second moisture measuring arrangement 3b to control the regulating element 8 for the second heat source 7.

Shown in FIG. 5 is a high frequency oscillator 76 whose frequency varies as a function of a control voltage applied thereto. A tuned circuit 78 is loosely coupled to the high frequency oscillator 76 via a high frequency amplifier 77. The output signal of the high frequency oscillator means 76 is herein referred to as a high frequency output signal. The voltage and current induced in the tuned circuit are herein referred to as electrical signals. The weak inductive coupling between the high frequency oscillator 76 and the tuned circuit 78 cause the current in the tuned circuit to have a constant phase relationship to the high frequency output voltage furnished by the high frequency oscillator 76.

However, the phase relationship between the output voltage of high frequency oscillator 76 and the voltage induced in tuned circuit 78 varies as a function of the moisture content of the tobacco which is in contact with the measuring capacitor 67 of FIG. 3. Thus phase comparator means, 79, have a first input connected to the tuned circuit means and a second input connected to the output of the high frequency oscillator means and furnish a phase angle signal at the output of the phase comparator means, which corresponds to the phase angle between the current and the voltage in the tuned circuit means. The phase angle signal is passed through a low pass filter 81 and amplified by an amplifier 82 and then applied as a control voltage controlling the frequency of high frequency oscillator 76. As indicated by dashed lines in FIG. 5, units 79, 81, 82 and 76 together are available in the form of an integrated circuit and as a designation "PLI circuit" from the Signetics Corp., 811 East Arques Ave., Sunnydale, Calif. The remaining stages in FIG. 5 are conventional stages which are well known in the art and which will not be described in detail.

It should be noted that the adjustment means which change an electrical parameter associated with the tuned circuit means comprise stages 81 and 82 through which the phase angle signal is applied to the high frequency oscillator. The electrical parameter in this embodiment is the frequency of the signal applied to the tuned circuit.

The measuring signal furnishing means which furnish an output signal varying as a function of the change in said electrical cahracteristic are, in the embodiment shown in FIG. 5, a comparator 83 which compares the frequency of the high frequency output of the oscillator 76 to the frequency of a signal supplied by a stabilized scillator 84. Stabilized oscillator 84 furnishes a constant frequency. The comparator has one input connected to the output of amplifier 77 and a second input connected to the output of oscillator 84 which is a quartz stabilized oscillator. The output of comparator 83 is transmitted through a frequency/voltage converter 86 to an inverting amplifier 87 whose output is in turn connected to one input of a range selector 88. The second input of range selector 88 is connected to the output of an inverting amplifier 89 whose input is connected to the output of a high frequency rectifier 91 which rectifies one of the electrical signals generated in tuned circuit 78, for example the voltage induced in said tuned circuit. It is noted that output of the range selector can constitute a measuring signal either based on the change in the electrical parameter associated with the tuned circuit or on the amplitude of one of the electrical signals generated in the tuned circuit, depending on whether the output of inverting amplifier 87 or the output of inverting amplifier 89 is connected to the output of range selector 88. The selection as previously mentioned depends upon the moisture content of the tobacco. For example range selector 88 can comprise threshold circuits which, for large amplitude input signals select the output of inverting amplifier 87 to constitute the measruing signal, while for small amplitudes, the output of inverting amplifier 89 is chosen to constitute the measuring signal.

The output of the range selector means is then applied to one input of a signal shaper 92 whose output is in turn applied to the input of an amplifier 97. The output of amplifier 97 activates a moisture indicator 98. Further, the output of signal shaper 92 is also applied to a comparator 99 which compares the amplitude of the measuring signal to the amplitude of a desired moisture signal furnished by a battery 101 connected in parallel with a variable resistor. The output of comparator 99, after amplification by an amplifier 102 controls the regulating elements 6 or 8 of FIG. 1. Further shown in FIG. 5 is a thermoresistor 60 which was also described with reference to FIG. 2. This resistor forms part of a bridge circuit 93 to whose output is connected a temperature indicator 94. The output of bridge circuit 93 is further applied through a regulator 96 to the signal former 92, in order to modify the measuring signal in dependence on the actual temperature of the tobacco.

Figure 6:
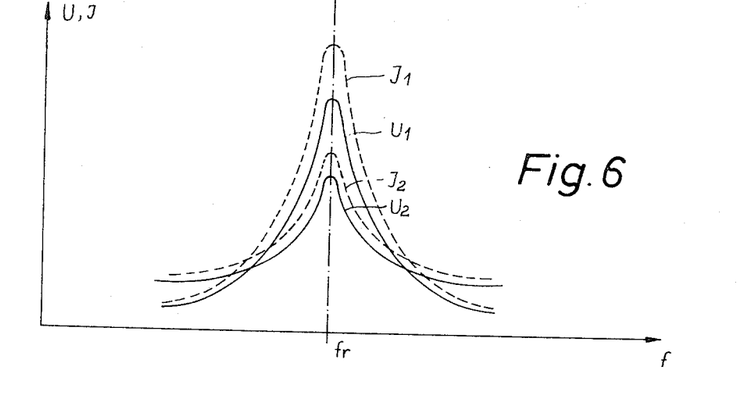
FIG. 6 shows the resonance curves for voltage and current in the tuned circuit.

FIG. 6 shows the resonance curves for both the voltage (U1, U2) and current (I1, I2) induced in tuned circuit 78 under conditions of two different moisture contents in the tobacco. The moisture content in the tobacco changes the resistance of the tuned circuit by changing the losses in measuring capacitor 67. The peaks of the curves at the resonant frequency constitute a measure for the moisture content of the tobacco. Increasing moisture content causes increasing damping of the tuned circuit so that the current and voltage peaks become lower for increasing moisture content. Thus curves U2 and I1 are taken under conditions of higher moisture content than are curves U1 and I1.

The above-described arrangement operates as follows:

Conveyor belt 14 transports the tobacco 13 in substantially constant quantities per unit time. The tobacco 13 first passes through the moisture measuring arrangement 3a and from there into the intake slide 11. From there it reaches the drum 1 and is exposed to the hot air entering by inlet 12.

Figure 7:
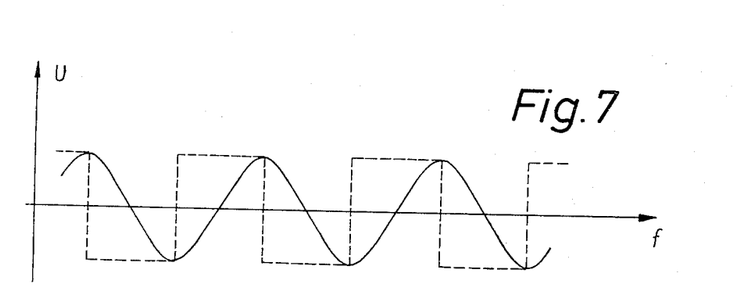
FIG. 7 shows the phase relationship between the high frequency oscillator output voltage and the voltage induced in the tuned circuit.

The temperature of the hot air is controlled by the circuit arrangement 28a (FIG. 5) and will now will be described in greater detail. First let it be assumed that tobacco having a relatively low moisture content passes over capacitor 67. Tuned circuit 78 is energized under these conditions by high frequency oscillator 76 through amplifier 77 in such a way that it is in resonance, that is the current and voltage in the tuned circuit have the same phase. Phase comparator 79 receives the voltage generated in the tuned circuit at a first input and the voltage generated by high frequency oscillator 76 at a second input. Under the above-described conditions of resonance, the phase angle between these two voltages is 90°. Reference to FIG. 7 shows the rectangular curve which indicates the output of oscillator 76 and a sinusoidal dashed line curve which represents the variation of voltage with respect to time of the tuned circuit. It will be noted that if the voltage at the output of the tuned circuit is summed from a time at which the high frequency oscillator voltage passes through zero until the next passage through zero of said high frequency oscillator voltage, then this sum will be equal to zero. Under these conditions phase comparator 79 does not give any output signal, so that the frequency of high frequency oscillator 76 remains unchanged.

The voltage generated in the tuned circuit is rectified by high frequency rectifier 91 and thereafter amplified by amplifier 89 and applied to one input of range selector 88. Also, the frequency of the high frequency output signal is compared in a comparator 83 which is a frequency comparator, to the frequency generated by a stabilized oscillator 84 which furnishes a constant frequency. Comparator 83 furnishes a difference frequency corresponding to the difference between the frequencies applied at its two inputs. The difference frequency is applied to the input of a frequency/voltage converter which furnishes a voltage corresponding to the frequency difference. This voltage is amplified and inverted and applied to the second input of range selector 88.

Figure 8:
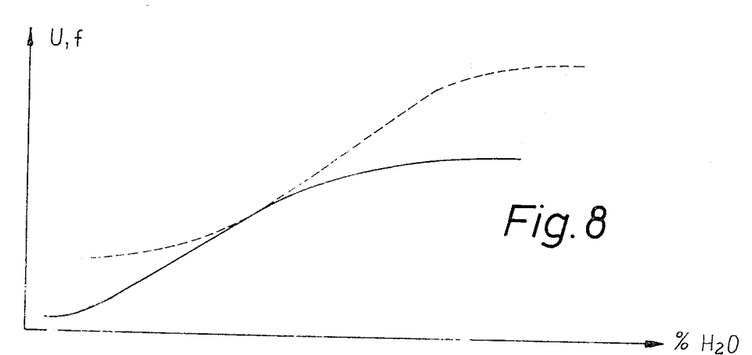
FIG. 8 shows the characteristic curves of the voltage induced in the tuned circuit of FIG. 5 and the voltage proportional to the change in frequency of the high frequency oscillator as a function of the moisture content of the fibrous material.

Reference should now be made to FIG. 8. FIG. 8 plots the measuring signal obtained by use of the high frequency rectified signal furnished by rectifier 91 versus the percent moisture content in the solid line. It will be seen that this is substantially linear in a region of low moisture content. The dashed line of FIG. 8 shows the measuring signal as a function of moisture content when derived from the output of inverting amplifier 87, namely from the frequency difference required to keep tuned circuit 78 in resonance. It will be noted that this curve is substantially linear in a higher moisture region. Thus the range selector 88 will select the output of inverting amplifier 89 to be the measuring signal under conditions of low moisture content and that of inverting amplifier 87 under conditions of higher moisture content. It is the function of signal shaper 92 to further improve the linearity of the already substantially linear signal applied thereto. A feedback amplifier circuit is used for this purpose.

Since the measuring signal also depends on the temperature of the tobacco forming part of the measuring capacitor, a thermoresistor 60 is furnished which slides via the above-described lever 55 on tobacco 13. The resistance value of this resistor varies the output signal of the bridge circuit 93. An indicator instrument 94 gives a resultant indication of the temperature of the tobacco. Further, the output signal of bridge circuit 93 is applied to an adjustable amplifier 96 which us used to adjust the effect that thermoresistor 60 has on the measuring signal. The output of signal shaper 92 is applied via an amplifier 97 to a moisture indicating instrument 98 which indicates the percent of water in the tobacco. Further, it is applied to a comparator 99 to the other input of which is applied a desired moisture signal signifying the desired moisture content of the tobacco. The difference between the two signals applied to the compartor, namely the difference between the actual and the desired moisture content of the tobacco is amplified by an amplifier 102. The output of amplifier 102 serves to control servo-motor 29 which in turn moves the air vent 31 associated with the first heat source 4. The temperature of the air is thus adjusted to correspond to the moisture in the tobacco being dried in drying drum 1.

If it is now assumed that the moisture content of tobacco 13 changes, then tuned circuit 78 will no longer be in resonance, that is the phase of voltage and current therein will no longer coincide. Thus the signals applied to phase comparator 79 also no longer have the same phase relationship. The sum of the voltages generated by tuned circuit 78 from one passage through 0 to the next of the high frequency output signal is no longer 0. Thus phase comparator 79 furnishes a signal which corresponds to the change in phase relative to the original phase. This signal is passed through low pass filter 81 and amplified by amplifier 82 and then applied to high frequency oscillator 76. High frequency oscillator 76 changes its frequency in correspondence to the so-applied controlled voltage. This process continues until tuned circuit 78 is again in resonance, that is until the voltage induced in tuned circuit 78 and the output voltage of high frequency oscillator 76 has the same relationship as shown in FIG. 7. Again, the voltage now induced in tuned circuit 78 is rectified by rectifier 91 and amplified by amplifier 89 and applied to one input of range selector 88. Further, the new high frequency oscillator output frequency is compared to the quartz stabilized oscillator 84 output frequency and a new difference signal is converted and amplified via stages 86 and 87 as mentioned above and applied to the second input of range selector 88. If the moisture content is now much higher than previously, the range selector 88 will operate to pass the output of inverter 87 onto signal shaper 92. The remainder of the circuit of course operates as described above, the moisture indicator 98 now indicating the new moisture content and amplifier 102 furnishing an output signal for controlling the air vent 31, thereby changing the ratio of heated air to unheated air which is applied to the tobacco. Thus the heated air applied to the tobacco has a temperature which varies as a function of the moisture content of the tobacco.

As tobacco 13 passes through drum 1, it is heated not only by the hot air discussed above, but also by the hot steam which passes through the steam hoses 9. At the output side of drum 1 the tobacco slides over the output slide 16 into the second moisture measuring arrangement 3b. This moisture measuring arrangement measures the moisture at the end of the drying process. The moisture content of the tobacco at the end of the drying process is processed by means of a circuit arrangement 28b which is identical to that described with reference to 28a, but serves to control the quantity of steam admitted to the steam hoses. In other words, the output of amplifier 102 of FIG. 5, when this is part of circuit arrangement 28b, controls servomotor 36 which in turn operates valve 38. Since other than that the circuitry is identical, it will not be described again. The second heat source 7 thus serves to compensate for any departure of the actual moisture content from the desired moisture content which has not been previously regulated by the first heat source.

It is a particular advantage of the present invention that very exact measuring signals can be obtained by keeping the tuned circuit in resonance at all times. It is a further advantage of the present invention that two parameters are available for indicating moisture content, namely either voltage or current induced in the tuned circuit or the change in frequency required for the output of high frequency oscillator 76 and that these two parameters furnish a greatly expanded measuring region.

The above-described arrangement has been found particularly desirable for tobacco dryers, that is for controlling the wall heating be it by steam, oil or gas heat and the air heat which is supplied by air flowing in the same direction as the tobacco. The correct moisture content required for further processing of the tobacco is readily achieved by the present invention.

While the invention has been illustrated and described as using particular parameters associated with a tuned circuit which is influenced by the moisture content and always maintained in resonance, it is not intended to be limited to the circuit shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior ar, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a system for processing fibrous material and having high frequency oscillator means furnishing a high frequency output signal, tuned circuit means coupled to said high frequency oscillator means and measuring capacitor means connected to said tuned circuit means for varying the phase angle between the current and voltage in said tuned circuit means as a function of the moisture content of said fibrous material, a method for furnishing a measuring signal indicative of said moisture content of said fibrous material, comprising, in combination, the steps of generating a phase angle signal indicative of said phase angle between said current and said voltage in said tuned circuit means; changing an electrical parameter associated with said tuned circuit means in dependence on said phase angle signal until said phase angle signal is equal to a predetermined phase angle signal indicative of resonance in said tuned circuit means; and furnishing first output signal varying as a function of said change in said electrical parameter said so-varying first output signal constituting said measuring signal.

2. A method as set forth in claim 1, further comprising the step of furnishing a second output signal varying as a function of the amplitude of voltage in said tuned circuit means; and selecting one of said first and second output signals to constitute said measuring signal.

3. A method as set forth in claim 2, wherein said step of generating a phase angle signal comprises comparing the phase of a first electrical signal generated in said tuned circuit means to the phase of said high frequency output signal.

4. A method as set forth in claim 3, wherein said step of changing an electrical parameter associated with said tuned circuit comprises changing the frequency of said high frequency output signal, thereby changing the frequency of the signal applied to said tuned circuit means.

5. A method as set forth in claim 2, wherein said selecting step comprises furnishing said first output signal when said moisture content of said fibrous material is in a predetermined first moisture content range, and selecting said second output signal when the moisture content of said fibrous material is in a second moisture content range having moisture contents exceeding the moisture contents in said first moisture content range.

6. A method as set forth in claim 2, further comprising the step of drying said fibrous material at a drying rate varying as a function of said measuring signal.

7. An arrangement for furnishing a measuring signal indicative of moisture content of fibrous material, comprising, in combination, high frequency oscillator means furnishing a high frequency output signal; tuned circuit means coupled to said high frequency oscillator means in such a manner that electrical signals including a voltage and a current are generated therein in response to said high frequency output signal; measuring capacitor means connected to said tuned circuit means, said measuring capacitor means having lines of force passing through said fibrous material, whereby the phase angle between said current and said voltage in said tuned circuit means varies as a function of moisture content in said fibrous material; phase comparator means connected to said tuned circuit means for furnishing a phase angle signal corresponding to said phase angle between said current and said voltage in said tuned circuit means; adjustment means connected to said phase comparator means, for changing an electrical parameter associated with said tuned circuit means in dependence on said phase angle signal until said phase angle signal is equal to a predetermined phase angle signal indicative of resonance in said tuned circuit means; and measuring signal furnishing means for selectively furnishing a first output signal varying as a function of said change in said electrical characteristic, said so-varying first output signal constituting said measuring signal.

8. An arrangement as set forth in claim 6, wherein said measuring signal furnishing means further comprise means for furnishing a second output signal varying as a function of a predetermined one of said electrical signals in said tuned circuit means; and selector means for selecting one of said first and second output signals to constitute said measuring signal.

9. An arrangement as set forth in claim 8, wherein said high frequency oscillator means comprise voltage-controlled oscillator means having a frequency varying as a function of a control voltage applied thereto; and wherein said adjustment means comprise means furnishing said control voltage to said voltage-controlled oscillator means.

10. An arrangement as set forth in claim 9, wherein said control voltage is a voltage proportional to the phase angle between said current and said voltage in said tuned circuit means.

11. An arrangement as set forth in claim 10, further comprising reference oscillator means furnishing a reference oscillator output signal having a constant frequency; and wherein said measuring signal furnishing means comprise frequency comparing means comparing said constant frequency to the frequency of said high frequency output signal and furnishing said first output signal as a function of the difference therebetween.

12. An arrangement as set forth in claim 8, wherein said high frequency output signal is a high frequency output voltage; and wherein said phase comparator means has a first input connected to said tuned circuit means and a second input connected to said high frequency oscillator means; and wherein said phase angle signal is a signal proportional to the difference in phase angle between said high frequency output voltage and said voltage generated in said tuned circuit means.

13. An arrangement as set forth in claim 11, wherein said means for furnishing a second output signal comprise high frequency rectifier means connected to said tuned circuit means; and wherein said selector means comprise means for furnishing said first output signal to constitute said measuring signal at a selector output when the moisture content of said fibrous material is in a low moisture range and for furnishing said second output signal to said selector output when the moisture content of said fibrous material is in a high moisture content range.

* * * * *